(12) United States Patent
Bradley (10) Patent No.: US 12,079,015 B1
(45) Date of Patent: Sep. 3, 2024

(54) SYSTEMS AND METHOD FOR RECHARGING AND NAVIGATING UNMANNED AERIAL VEHICLES USING THE ELECTRICAL GRID

(71) Applicant: Logan W. Bradley, Arlington, VA (US)

(72) Inventor: Logan W. Bradley, Arlington, VA (US)

( * ) Notice: Subject to any disclaimer, the term of this patent is extended or adjusted under 35 U.S.C. 154(b) by 259 days.

(21) Appl. No.: 17/582,144

(22) Filed: Jan. 24, 2022

(51) Int. Cl.
*G05D 1/644* (2024.01)
*B60L 53/12* (2019.01)
*B64U 101/60* (2023.01)

(52) U.S. Cl.
CPC .............. *G05D 1/644* (2024.01); *B60L 53/12* (2019.02); *B60L 2200/10* (2013.01); *B64U 2101/60* (2023.01)

(58) Field of Classification Search
CPC ..... G05D 1/644; B60L 53/12; B60L 2200/10; B64U 2101/60
See application file for complete search history.

(56) References Cited

U.S. PATENT DOCUMENTS

| | | | |
|---|---|---|---|
| 7,714,536 B1* | 5/2010 | Silberg ................... | B64U 80/25 320/108 |
| 10,099,561 B1* | 10/2018 | Ananthanarayanan ...................... | B60L 53/126 |
| 2017/0015414 A1* | 1/2017 | Chan ...................... | B64C 39/024 |
| 2017/0271926 A1* | 9/2017 | Plekhanov ............ | H02J 50/402 |
| 2019/0143827 A1* | 5/2019 | Jaugilas ............... | G08G 5/0086 320/109 |
| 2019/0144112 A1* | 5/2019 | Jaugilas ................... | B60L 5/005 244/75.1 |
| 2019/0176984 A1* | 6/2019 | Wabnegger .............. | H02G 1/02 |
| 2022/0198944 A1* | 6/2022 | Mclemore ............ | G08G 5/0043 |
| 2022/0244127 A1* | 8/2022 | Aubrey ................. | G01M 3/002 |

* cited by examiner

*Primary Examiner* — Ryan Rink (57) ABSTRACT

An unmaned aerial vehicle includes an inductive charging coil for receiving an electric charge from the electrical grid by traveling within the electric field generated by power lines or by landing on a charging platform powered by the electrical lines. The unmaned aerial vehicle is able to navigate its route by sensing the electrical or heat signature generated by power lines and a map of the electrical lines to determine its geographic position at a given time and a route to a desired destination.

1 Claim, 6 Drawing Sheets

SYSTEMS AND METHOD FOR RECHARGING AND NAVIGATING UNMANNED AERIAL VEHICLES USING THE ELECTRICAL GRID

CROSS REFERENCE TO RELATED APPLICATIONS

This application claims the benefit of priority under 35 U.S. C. 119(e) to U.S. Provisional No. 63/206,277 filed on Jan. 27, 2021, the entire contents of which are hereby incorporated by reference in their entirety.

FIELD OF THE INVENTION

The present invention generally relates to recharging the power supply of unmanned aerial vehicles (UAVs) or other battery-powered craft. More specifically, the present invention relates to the use of the electrical grid of a locality to allow UAVs such as drones and other battery-powered craft to recharge their power source in remote locations. Additionally, aspects of the present invention relate to use of the electrical grid to aid navigation of terrain.

BACKGROUND OF THE INVENTION

The use of lightweight, unmanned aerial vehicles (UAV) has become increasingly more common in recent years. Many, if not most, of these craft utilize non-combustion materials, typically rechargeable battery cells, as a power source. Drones, for example, are destined to become ubiquitous in modern society as the capabilities and uses of these craft continue to expand as advancements in the art of controlling and navigating these craft continuing to evolve. Product suppliers and shippers, such as Amazon.com, have indicted an intention to utilize a fleet of drones for the purposes of expeditious delivery of merchandise and other materials through the air. Drones have the advantage of not having to be sized nor safe enough for human passengers, which provides many options in design and facilitates the use of batteries as a power source.

As will be appreciated by one of ordinary skill in the art, while battery power presents a safe alternative to fossil fuels in the event of an accident or otherwise, current battery technology places an inherent limit to the distance UAVs such as delivery drones can fly before needing to be recharged. As such, the delivery distance from a home base of such a drone is greatly limited and presents a significant drawback in the art. Other drawbacks in the art recognized by the inventor includes the need to have sufficient power or battery life to allow the drone to return to its starting point for recharging, essentially cutting the service radius of the drone in half. Additionally, the lack of recharging facilities limits the areas of use of drones as well as presenting a capital expenditure in infrastructure that may prove cost prohibitive in most circumstances.

Yet another drawback of current UAV technology relies in remote control and navigation is remote areas or for extended distances. As will be appreciated, maintaining a direct connection with a UAV is problematic as the distance between the controller and UAV grow; and UAVs with GPS technology may be limited in areas with poor or nonexistent cellular reception or limited to UAVs having very expensive and difficult to procure satellite navigation communications.

The foregoing highlights some of the problems with conventional UAV or UAV technology as it exists today and as recognized by the present inventor. Furthermore, the foregoing highlights the present inventor's recognition of long-felt, yet unresolved needs in the art for a UAV with a vast service radius. In addition, the foregoing highlights the inventor's recognition of a need in the art for providing access to recharging services for UAVs remote from their home base or launch site. The foregoing also highlights the present inventor's recognition of the need for a cost-effective UAV recharging infrastructure that allows UAVs to be used in remote areas. Finally, the foregoing highlights the present inventor's recognition of the need for a reliable and inexpensive method for UAV navigation in remote areas.

SUMMARY OF THE INVENTION

Various embodiments of the present invention overcome various of the aforementioned and other drawbacks associated with conventional UAVs (e.g, drones) and the like (e.g., electric powered vehicles) and offers new advantages as well.

The present invention is based, in part, on the present inventor's recognition of a need in the art to increase the service distance of a UAV. To this end, the present inventor recognized that the electrical infrastructure, or grid, of modern civilization's power systems presents access to electricity that flows through thousands and thousands of miles of, mainly, above-ground wires. As will be appreciated, these wires, and the towers and poles that suspend them, often span even the remotest and sparsely populated areas of the United States (and other jurisdictions around the world).

The present invention is also based, in part, on the present inventor's recognition that the electrical grid could be manipulated or harnessed to provide power to recharge the power supplies or batteries of battery-powered craft. The present invention is also based, in part, on the present inventor's recognition that the heat and/or magnetic energy produced by electricity flowing through the electrical grid infrastructure could be used in a manner akin to a roadmap for navigation purposes.

While the present invention will be described in more detail in connection with the example of recharging and navigating DC-battery powered unmanned aerial drones, one of ordinary skill in the art will readily appreciate that the inventions described herein are applicable to numerous devices, fields, and uses and all of such variations should be understood to be part of the present invention. For example, non-aerial battery-powered craft could be adapted to make use of various advantageous features of the present invention.

According to one aspect of various embodiments of the present invention, there is provided a UAV having a means for receiving a charge from the electrical lines, towers, or utility poles of the electrical power grid. According to the invention, the recharging can be active or passive. According to an aspect of passive charging, a UAV can make use of inductive charging by parking or flying in proximity to electrical power lines, towers, and/or poles. According to an active charging aspect of the present invention, there is provided an electrical grid component having means for providing a charge to a UAV. In some advantageous embodiments, the UAV includes a plug mechanism or plug receiving mechanism to electrically couple to a plug receptacle or plug of a charging area associated with a power line, transmission tower or distribution pole. In a preferred embodiment, a charging station is physically and electrically attached to an electrical tower or utility pole for receiving a UAV. The charging station may comprise a landing pad having a plug receptacle configured to receive a corresponding plug member provided on a UAV. Alternatively, the charging station may have a plug for mating with a receptacle provided on a UAV or vice versa. According to some embodiments, the landing pad provides a landing surface for a UAV to land and receive an electrical charge provided by parasitic removal of electricity from the power lines associated with the tower, pole, or line associated with the charging station.

In other advantageous embodiments, the UAV is configured for inductive charging and recharges at one of any induction recharging areas associated with power lines, towers, or poles. In certain embodiments, the induction recharging area comprises and induction plate preferably having a landing pad. The induction plate is configured to receive a UAV and provide electricity sufficient to allow for inductive charging of a UAV parked on the plate according to methods known in the art. For example, the UAV and plate may comprise cooperating coils or antennas that use frequency modulation or the like to inductively charge the UAV's batteries through associated circuitry. In other embodiments, the UAV may be equipped with a toroidal coil or other electromagnetic components and pass over the power lines in near proximity in order to receive an electric charge for its batteries. As will be appreciated, in a coil embodiment, by virtue of natural phenomena, the coil will receive a charge when brought in the vicinity of the power lines or related equipment from the magnetic current generated by the electricity passing through the power lines and equipment. Accordingly, in some embodiments the UAV is recharged through induction via a toroidal coil. In some other embodiments, the toroidal core surrounds an electric power line and generates AC power that is received and rectified into DC power for recharging the UAV's batteries. In any event, as will be appreciated, inductive charging through proximity to the magnetic field generated by the electricity passing through power lines allows for the UAV to be charged in flight.

With inductive embodiments, a landing pad may or may not be used depending on the specific application and configuration of the UAV. Likewise, the recharging may be using the power lines as they normally exist or a special wire may be deployed extending a length in the area of the towers to serve as the source of electricity for the toroidal coil or other inductive charging components. Inductive charging is well understood in the art for both high and low voltage applications and both should be understood to be within the scope of the present invention. Likewise, magnetic energy harvesting by surrounding an electrical wire with a toroidal core is well understood in the art as Farraday's law of induction applies.

In embodiments where a landing pad is used, the invention should be understood to include any pad of any suitable size, shape, or material. The same holds true for those embodiments using an induction plate. It is well within the ability of one of ordinary skill in the art to configure a suitable landing pad, induction plate, and/or charging station to achieve many of the advantages of the present invention. For example, certain materials of construction may be advisable based on the climate of the area, electric codes, or other reasons.

Likewise, weep holes, roofing, wind breaks, and other countermeasures for the elements commonly associated with outdoor electrical equipment or otherwise may be advantageously used with the embodiments herein and should be understood to be within the scope of the invention. Similarly, grounding, shielding, isolators, and other advantageous or necessary safety equipment when connecting equipment or devices with or near power lines should be used where proper, whether required by code or not, as will be understood by those of ordinary skill in the art. Preferably, where necessary, landing pads should be configured, isolated, or protected from being accessible, a fire hazard, and/or leading to the electrocution wildlife. Similarly, UAVs should be appropriately configured to protect internal components from electrical phenomena associated with high voltage power lines such as arcing and flashing.

In various preferred embodiments, the recharging area will include a communications unit. The communications unit may comprise one or both of the functionalities of communications with the grid and/or communications with the UAV traffic. As will be appreciated, it may be necessary or advantageous in certain embodiments to integrate the recharging area into the communications network of the electrical grid, or "smart grid." This may be important to prevent a landing UAV that will be drawing power from the grid to be perceived as a fault in the line causing the safety systems to isolate the perceived fault and black out the area. In a presently preferred embodiment, the communication unit, much like a recloser, can identify to the system that a landing UAV is not a fault and the safety systems do not need to shut down power to the line. In other embodiments, the recharging area may be configured to receive electrical power in a manner that removes it from having fluctuations being registered or identified by the grid's safety devices, for example, in a manner similar to lights provided on utility poles.

In embodiments wherein the communications unit communicates with the units to be recharged, any suitable means of communication and coordination should be understood to be within the scope of the invention. One of ordinary skill in the art armed with the present application can easily implement a communications network and protocol to achieve various advantages of the present invention. As will be appreciated, a communications network may serve many purposes, either as an integrated single device or central system having various functions or various discrete communications systems provided in the overall system where necessary or desired.

According to some embodiments of the invention, the communications unit may be a relatively simple system that allows for the recharging system to communicate information regarding a UAV using it for recharging. The communications unit may receive information sufficient to identify the UAV or its owner and track how much electricity was consumed in recharging to allow the system to invoice for the service. Similarly, the communications unit may separately, or in addition to identifying the UAV and consumption, communicate directly with an incoming UAV. The communications may be as simple as letting a UAV know that the charging area is free of traffic and open for landing. Alternatively, the communications may be more complex and involve two-way communications, scheduling, and the like. In some embodiments, the communications system may communicate with the UAV only by reading an RFID tag or the like to identify the UAV and its requirements. In other embodiments, the UAV and charging area may communicate using radio, Wi Fi, PLC, or long range systems to coordinate location and even scheduling and the like. In some embodiments, the UAVs and charging stations are part of an integrated communications network that allows the locations of the charging stations and their status communicated to UAVs and/or as part of an overall air traffic control system configured to track UAVs, their travel, and their recharging.

In a presently preferred embodiment, the communication system is configured to communicate with both the electrical grid and the UAV/UAV traffic. Communications with the UAV traffic is preferably multifaceted as discussed above. The communications with the electrical grid is similarly multifaceted as part of the "smart grid" or a SCADA to coordinate with safety equipment to prevent false alarms and well as track their usage and their overall health for preventative maintenance and replacement.

According to another advantageous feature of various embodiments of the present invention, the UAV may be equipped to use the magnetic field or heat pattern of the electrical grid for navigation. For example, the UAV may have a map of the electrical grid and be able to detect and use the heat or magnetic output of the power lines and equipment to find its location and then follow these indicators as a map in order to navigate to its destination in areas or in UAVs not equipped with GPS or satellite navigation. Preferably, the UAVs can follow the mapping of the electrical grid to their ultimate destination down to an individual address if necessary. In accordance with one embodiment, the UAV is provided with a navigation module and camera module that comprises a detector that allows for detection of the magnetic output of the electrical grid. In alternative embodiments, the UAV is provided with a navigation module and camera module that comprises a detector that allows for detection of the heat generated by resistance in power lines in order to navigate using the electrical grid. In yet another preferred embodiment, a UAV is equipped with the ability to sense both heat and magnetic energy.

The invention as described and claimed herein should become evident to a person of ordinary skill in the art given the following enabling description and drawings. The aspects and features of the invention believed to be novel and other elements characteristic of the invention are set forth with particularity in the appended claims. The drawings are for illustration purposes only and are not drawn to scale unless otherwise indicated. The drawings are not intended to limit the scope of the invention. The following enabling disclosure is directed to one of ordinary skill in the art and presupposes that those aspects of the invention within the ability of the ordinarily skilled artisan are understood and appreciated.

BRIEF DESCRIPTION OF THE DRAWINGS

Various aspects and advantageous features of the present invention will become more apparent to those of ordinary skill when described in the detailed description of a preferred embodiment and reference to the accompany drawing wherein.

DETAILED DESCRIPTION OF A PREFERRED EMBODIMENT

Exemplary presently preferred embodiments of a system according to various advantageous features of the invention are depicted in FIGS. 1-6.

Figure 1:
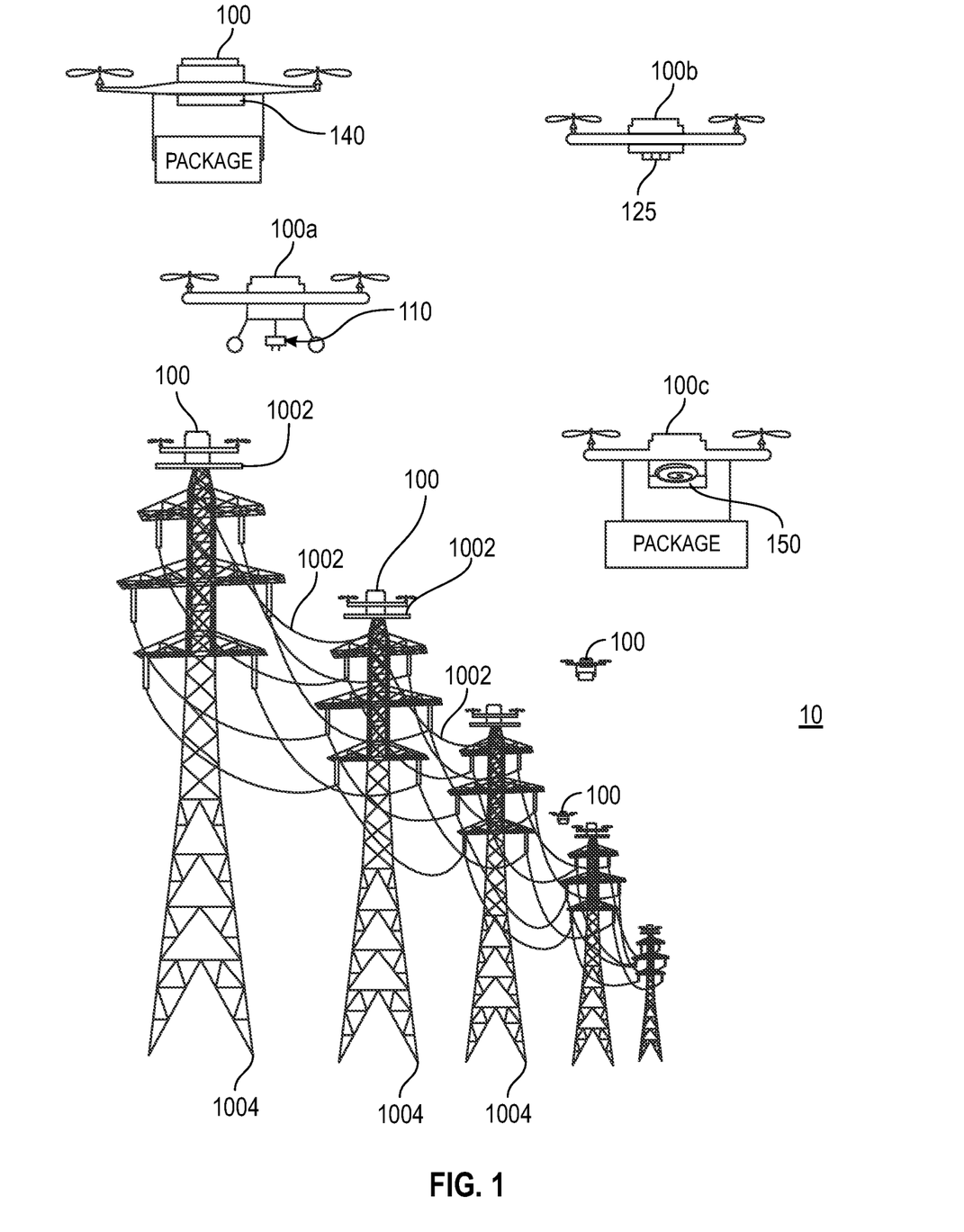
FIG. 1 depicts a two-dimensional drawing of an environment view of an embodiment of UAV traffic using components of the electrical grid according to various advantageous features of various embodiments of the present invention.

FIG. 1 is a depiction of an environment 10 that includes a plurality of UAVs 100 embodying various features of various aspects of the present invention. As depicted in operation, the UAVs 100 use the components of the electrical grid 1000 such as transmission lines 1002, transmission towers 1004, distribution lines 1012 and utility poles 1014 and in some cases special landing pad recharging platforms 2002 for recharging, communication, and/or navigation as conceived by the present inventor.

As shown in FIG. 1, UAV 100a may comprise any suitable configuration, such as a quadracopter of the type known in the art, which may be further equipped with a recharging plug 110 configured for mating with a receptacle (not shown) on a charging station landing pad 120. Alternatively, UAV 100b may have any suitable design such as a quadracopter and further including an induction charging coil 130 for positioning over a cooperating charging coil (not shown) on a charging station landing pad 120 to facilitate induction recharging of the UAV. Also, according to an aspect of the invention, UAV 100c may include a tordoil coil 150 and related circuitry to allow charging to occur when the UAV is flown within the magnetic field generated by the electricity passing through the power lines.

Figure 2:
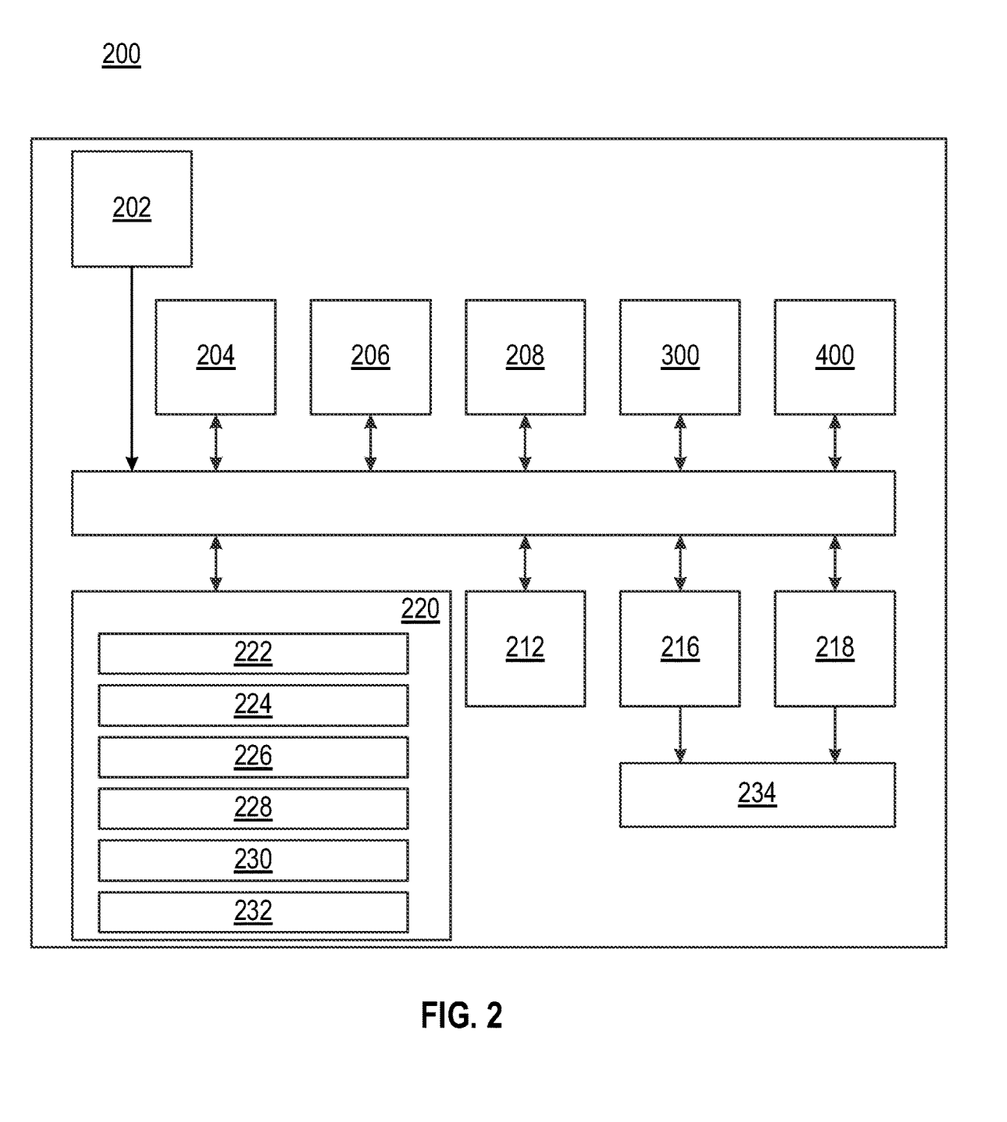
FIG. 2 depicts a block diagram of an illustrative UAV architecture of an embodiment of a UAV configured for use and embodying various advantageous features of representative embodiments of the present invention.

FIG. 2 is a block diagram of an illustrative UAV architecture 200 of a representative UAV 100 adapted for use in connection with various embodiments of the present invention. As will be appreciated, the UAV architecture 200 may be used to implement the various systems, devices, and techniques discussed above and hereinafter. In the illustrated implementation, the UAV architecture 200 includes one or more processors 202, coupled to a non-transitory computer readable media 220 via an input/output (I/O) interface 210. The UAV architecture 200 may also include a propeller motor controller 204, power supply module 206 and/or a navigation system 208. The UAV architecture 200 further includes an inventory engagement mechanism controller 212, a network interface 216, one or more input/output devices 218, a recharging module 300, and a thermal and/or magnetic detection and mapping module 400.

In various implementations, the UAV architecture 200 may be implemented using a uniprocessor system including one processor 202, or a multiprocessor system including several processors 202. The processor(s) 202 may be any suitable processor capable of executing instructions. For example, in various implementations, the processor(s) 202 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 202 may commonly, but not necessarily, implement the same ISA.

The non-transitory computer readable media 220 may be configured to store executable instructions/modules, data, flight paths, electronic grid mapping, and/or data items accessible by the processor(s) 202. In various implementations, the non-transitory computer readable media 220 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable memory. In other implementations, program instructions, data and/or flight paths may be received, sent or stored upon different types of computer-accessible media, such as non-transitory media, or on similar media separate from the non-transitory computer readable media 220 or the UAV architecture 200. Generally speaking, a non-transitory, computer readable memory may include storage media or memory media such as flash memory (e.g., solid state memory), magnetic or optical media (e.g., disk) coupled to the UAV architecture 200 via the I/O interface 210. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 216.

In one implementation, the I/O interface 210 may be configured to coordinate I/O traffic between the processor(s) 202, the non-transitory computer readable media 220, and any peripheral devices, the network interface or other peripheral interfaces, such as input/output devices 218. In some implementations, the I/O interface 210 may perform any necessary protocol, timing or other data transformations to convert data signals from one component (e.g., non-transitory computer readable media 220) into a format suitable for use by another component (e.g., processor(s) 202). In some implementations, the I/O interface 210 may include support for devices attached through various types of peripheral buses, such as a variant of the Peripheral Component Interconnect (PCI) bus standard or the Universal Serial Bus (USB) standard, for example. In some implementations, the function of the I/O interface 210 may be split into two or more separate components, such as a north bridge and a south bridge, for example. Also, in some implementations, some or all of the functionality of the I/O interface 210, such as an interface to the non-transitory computer readable media 220, may be incorporated directly into the processor(s) 202.

The propeller motor(s) controller 204 communicates with the navigation system 208 and adjusts the power of each propeller motor to guide the UAV along a determined flight path. The power supply module 206 may control the charging and any switching functions associated with one or more power modules (e.g., batteries) of the UAV.

The navigation system 208 may include a GPS or other similar system that can be used to navigate the UAV to and/or from a location. The system also preferably uses the detection 300 and mapping 400 modules to navigate when GPS is unavailable as discussed herein.

The inventory engagement mechanism controller 212 communicates with the actuator(s) or motor(s) (e.g., a servo motor) used to engage and/or disengage inventory. For example, when the UAV is positioned over a level surface at a delivery location, the inventory engagement mechanism controller 212 may provide an instruction to a motor that controls the inventory engagement mechanism to release the inventory (e.g., an item or a package). Similarly, in embodiments where a cargo hold is used, the controller 212 off-loads the item or package prior to landing on the recharging pad 2004.

The network interface 216, such as a transceiver, may be configured to allow data to be exchanged between the UAV architecture 200, other devices attached to a network, such as other computer systems, and/or with UAV control systems of other UAVs. For example, the network interface 216 may enable wireless communication via signal sources and/or directly with other UAVs. In various implementations, the network interface 216 may support communication via wireless general data networks, such as a Wi-Fi network. For example, the network interface 216 may support communication via telecommunications networks such as cellular communication networks, satellite networks, and the like. The network interface 216 also preferably communicates with communication system of recharging pads to gauge accessibility and charging data.

Input/output devices 218 may, in some implementations, include image capture devices, a magnetometer, infrared sensors, time of flight sensors, accelerometers, lights, speakers, and other input/output devices commonly used in aviation. Multiple input/output devices 218 may be present and controlled by the UAV architecture 200. One or more of these sensors may be utilized to assist in navigation, landings, and avoiding obstacles during flight.

In some embodiments, the computer readable media 220 may store a flight plan module 222, a flight controller 224, the locating component 226, and a UAV communication module, which are described in turn. The components may be stored together or in a distributed arrangement. The computer readable memory may also store data 230, such as a flight plan, signal source data, waypoints, predetermined landing sites, recharging stations, a weather forecast, and other data. The data 230 may include mapping of the electrical grid and known locations for recharging, such as tower recharging platforms to be used to execute the flight plan in coordination with the recharging module 300. The data 230 may include a complete map of the electrical grid of a locality to allow the UAV to use its detection of the heat or magnetic energy from transmission and power lines to navigate to and from a predetermined destination in cooperation with the mapping module 400.

In operation according to a preferred embodiment, in areas where GPS or cell service is lost, the magnetometers and/or heat sensors detect power lines and track them according to a map of know power line locations. In this manner, the power lines can be followed much like a road map and allow the UAV to continue to its destination while preferably also receiving a recharging of its battery through induction.

The flight plan module 222 may receive, maintain, update, and/or create a flight plan for use by the UAV, implemented by the flight controller 224 and navigation system. The flight plan module 222 may receive inputs from the signal source analyzer 226 and may update the flight plan (or create a new one) accordingly, which may include different waypoints and/or other different navigational information.

The flight controller 224 may implement the flight plan as well as control the UAV in accordance with the navigation system 208 as described in more detail herein. The flight controller 224 may make changes in a direction or conduct of flight based on the information from the signal source analyzer 226 without necessarily receiving a change in the flight plan.

The locating component 226 may determine a location of the UAV 100 using any of the techniques described herein. In some embodiments where GPS or satellite navigation is unavailable, the locating component 226 may detect the magnetic and/or heat generated by the power lines carrying electricity in coordination with the recharging module 300 and use a map of the known location of the power lines to navigate to a desired destination in coordination with the mapping module 400.

The UAV communication module 228 may perform communications operations with the service provider (controller) and/or with other UAVs. The UAV communication module 228 may also interact with recharging platforms communications 2040 or other equipment on the electrical grid as described in more detail below.

The data 230 may include the signal source data, which may be all of or a portion of data included in a signal source data repository created and/or maintained at least in part by a service provider. The data 230 may include a whitelist (which may be included in the signal source data) that designates trusted signal sources.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV architecture 200 is merely illustrative and is not intended to limit the scope of the present disclosure. In particular, the computing system and devices may include any combination of hardware or software that can perform the indicated functions, including computers, network devices, etc. The UAV architecture 200 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Figure 3:
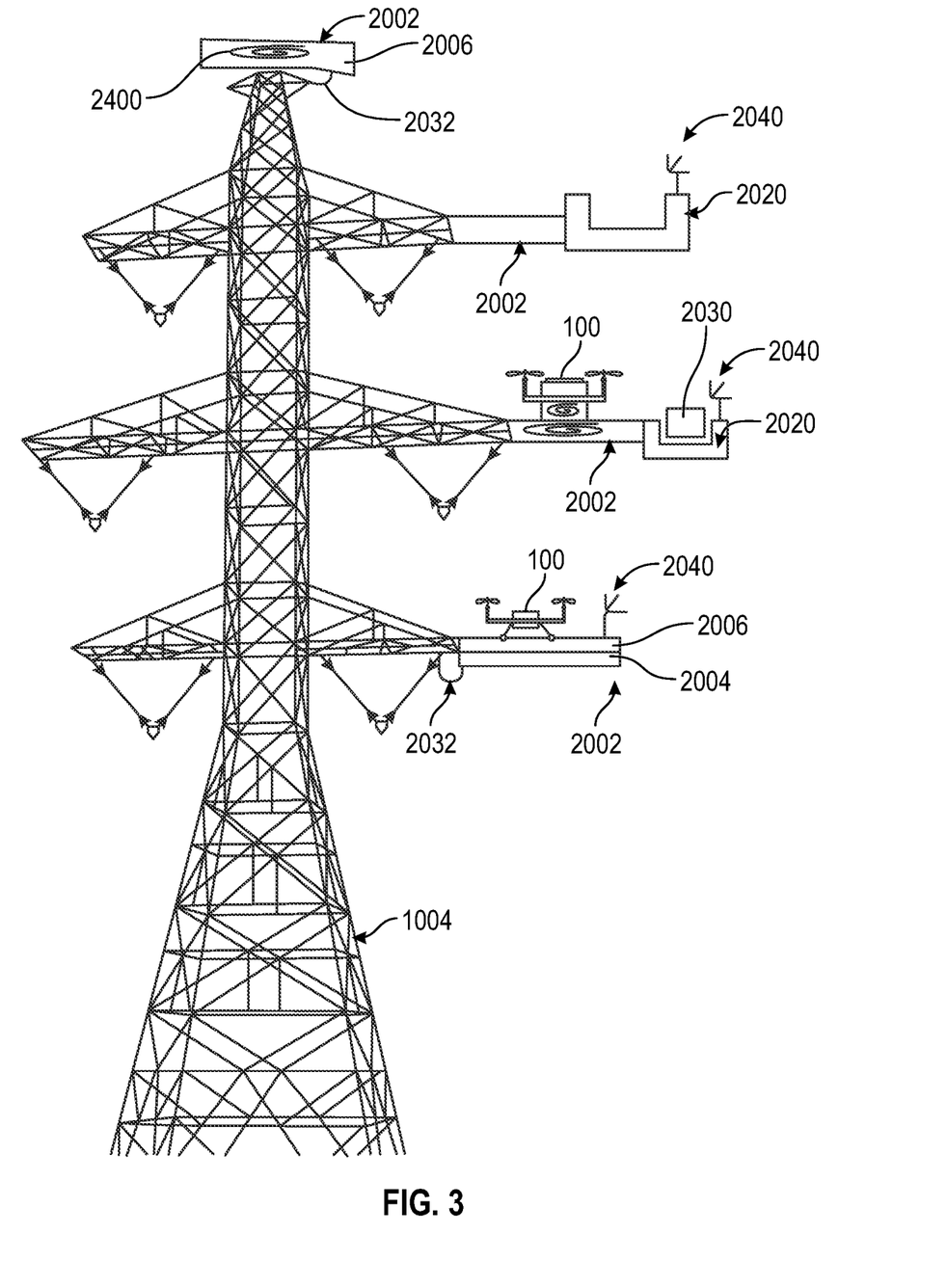
FIG. 3 depicts various embodiments on landing pads and cargo holders according to various embodiments of the present invention.

FIG. 3 is a diagram illustrating examples of landing platforms 2002 in accordance with various advantages features of various embodiments of the invention. Referring now to FIG. 3, the example includes a platform member with communications capability 2040 and battery charging capability 2004, and that should be appreciated as being capable of being selectively configured to provide direct or inductive (or both) charging capabilities for a docked UAV.

As illustrated, landing platform 2002 includes a landing floor 2006 configured to serve as a landing pad for receiving and supporting UAVs 100. The floor 2006 can be appropriately sized for a single UAV or it can be large enough for multiple UAVs. Additionally, as configured in other embodiments, multiple floors can be provided in a single landing platform location, or hub, if such UAV infrastructure along a frequent route is justified. In sum, various embodiment of landing platforms 2002 can be selectively configured to receive or support multiple UAVs and can be configured for direct or inductive charging (or both).

The landing platforms 2002 may include a cargo hold 2020 for holding cargo 2030 while the UAV recharges. The landing platforms preferably include a parasitic electrical power supply 2032 to feed electricity to the battery charger 2004 or inductive coil 2400.

Figure 4A:
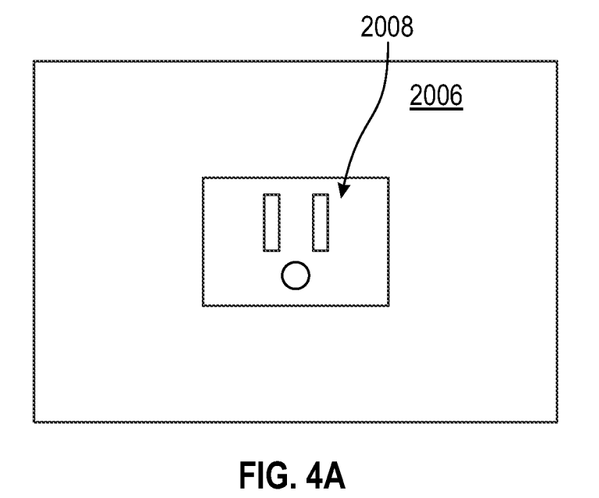
FIG. 4A is a top view of a landing platform equipped with a charging receptacle.
Figure 4B:
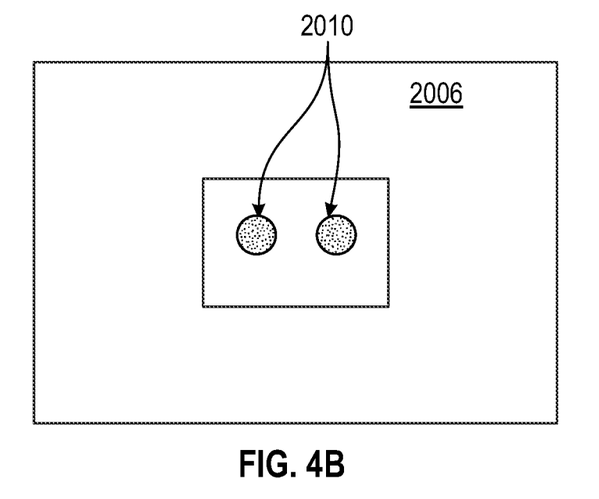
FIG. 4B is a top view of a landing platform having a top surface equipped with charging tines and an inductive coil deployed below the top surface.

With respect to direct charging embodiments, in a first preferred embodiment as shown in FIG. 4A, the floor 2006 can be equipped with a plug receptacle 2008 for receiving a charging prong(s) 170 provided on the UAV 100. Alternatively, as shown in FIG. 4B, the floor 2006 can be equipped with charging prongs 2010 for insertion in a charging receptacle 180 disposed on the UAV 100. Although not clearly shown, in either case, the floor 2006 may cover an inductive charging coil so either inductive or direct charging is available.

In other alternative embodiments, the floor 2006 may comprise a top surface and a bottom surface wherein each of the surfaces of floor 2006 may be implemented to include a multitude of conductive surfaces with positive and negative polarities arranged in a predetermined pattern such that when the UAV lands on the floor 2006 corresponding conductors on the docking elements (e.g. feet) 155 of the UAV 100 make the appropriate electrical contact. The predetermined pattern for these conductive surfaces on the platform can include, for example, a checkerboard pattern. The pattern can be sized and configured such that when one foot of the UAV is on a pattern element of a given polarity, the opposite foot of the UAV will be positioned on a pattern element of the other polarity. As will be appreciated by one of ordinary skill in the art, insulative spacing between the pattern elements can be large enough such that a foot of the UAV cannot cause a short between adjacent pattern elements of opposite polarities.

The landing platforms 2002 and floors 2006 of the various embodiments are preferably configured to contain structural elements and be composed of suitable materials so as to provide a weatherproof and/or weather-resistant landing pad to support the UAV and any associated parcels or equipment. For example, platform 2002 can include drainage holes, sloped edges to ensure precipitations do not pool on floor 2006. Similarly, floor 2006 can be composed of weather and rust resistant material such as polycarbonate, rubber, or other such material to withstand the elements.

Figure 5A:
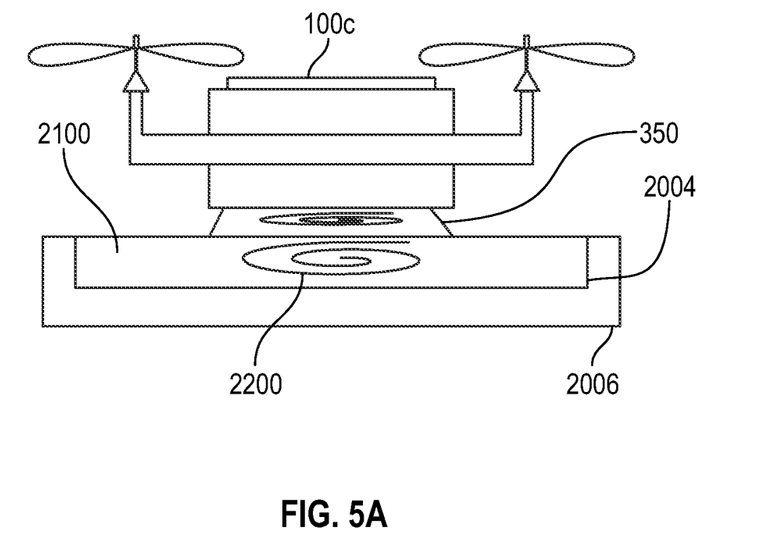
FIG. 5A is a side view in partial cross-section of a landing pad having an inductive charging plate and antenna for charging a UAV provided with a cooperating antenna and related circuitry.

Referring now to FIG. 5A, in operation, an inductive charging landing platform 2002 may receive a UAV 100c. As depicted, an inductive or other wireless battery charger 2024 may be deployed to charge the batteries of the UAV 100 while it is docked on the landing platform 2002. The wireless battery charger 2024 may implement any of a number of different wireless charging techniques including, for example, an inductive charger(s) 2100 using coils 2200 to induce current in a corresponding coil 350 in the UAV 100, through which cooperating frequency modulation circuitry (not shown) allows for the UAV battery to receive an appropriate charge as will be appreciated by one of ordinary skill in the art. Or as another example, battery charger 2004 can include a low-frequency electromagnetic radiation source 2400 that transmits its energy to a power-harvesting circuit 355 or tordoil coil assembly in the UAV.

Figure 5B:
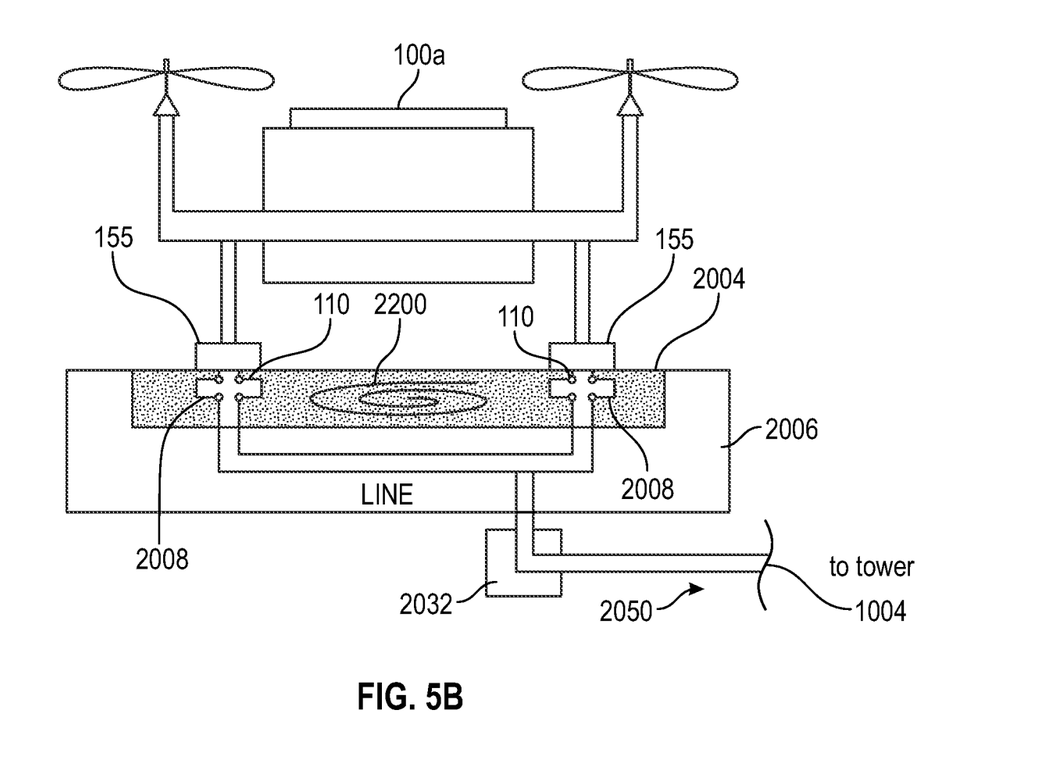
FIG. 5B is a side view in partial cross-section of a landing platform equipped with plug receptacles for receiving one or more charging plugs from a UAV and also an inductive charging plate.

Alternatively, as shown in FIG. 5B, wired connections can be made with the UAV by docking the UAV on floor 2006 such that electrical contacts on the UAV lineup with and connect to corresponding electrical contacts on platform 2002 akin to an electric toothbrush recharger or the like. Or alternatively, the floor may provide for direct connection of plug members 155 mating with one or more plug openings 2008 in the floor 2006 connected to line voltage.

In the above landing platform embodiments, simple parasitic siphoning of electricity to power the charging capabilities of the pads are contemplated given that the platforms are provided at locations along the electrical lines of the electrical grid and thus have a never ending supply of AC power. A power supply 2032 can be included to provide power to battery charger 2024 as well as to the communications equipment 2400 (described below). Power supply 2032 may include the appropriate AC to AC, AC to DC, DC to AC, or DC to DC power conversion components necessary to supply the appropriate power to the various devices. Configuring the power supply circuitry is well within the skill of one of ordinary skill in the art armed with the present specification.

Figure 6:
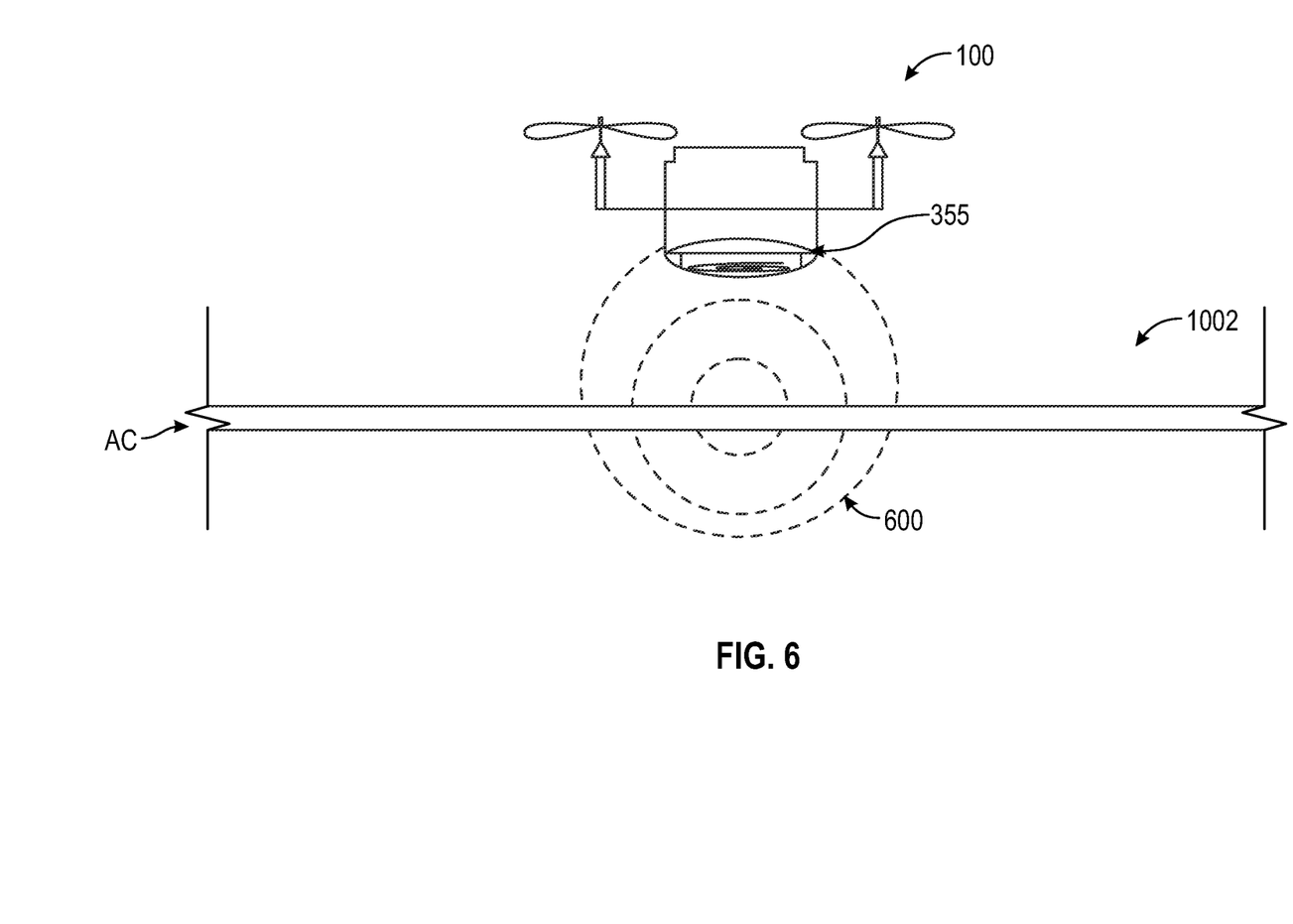
FIG. 6 is a side environmental view of a UAV equipped with a coil for inductive charging using the magnetic field generated by AC electricity flowing through transmission or power lines.

According to a preferred embodiment of the invention depicted in FIG. 6, the UAV is charged using the magnetic field generated by transmission and power lines carrying electrical current. Specifically, as will be appreciated, magnetic energy harvesting by surrounding an electrical wire with a toroidal core is well understood in the art as Farraday's law of induction applies. By bringing a coil within the magnetic field generated by the power lines, a current is created and may be siphoned to recharge a battery. This embodiment may be preferred due to the lack of investment in infrastructure required. The thousands and thousands of miles of transmission and power lines crisis-crossing the country provide a readily available source of inductive electricity.

Understanding that the power generation is small and requires a drone equipped with a coil to travel in close proximity to the lines, provides various challenges as will be appreciated by those skilled in the art. In order to lessen the potential damage to the UAV and its electrical components through arcing or similar phenomena resulting in huge voltage spikes, the UAV may be configured to include a Farraday cage exoskeleton or housing or insulation for critical components.

The UAV may also be configured to allow for circuitry to dissipate voltage spikes. For example, a prior art technique would make use a spherical UAV body comprising a light weight, high strength plastic, or other suitable material, which is then coated with a metallized surface coat to shield the internal circuitry. The body of the UAV may be subdivided into eight spherical quadrants, four metallic patches bonded through a thin dielectric to the metallized surface of the UAV body in the four quadrants the upper half thereof. These patches, together with the dielectric separating them from the metallized surface, form four capacitors which are connected in parallel. Power conductor creates a charging current on these parallel connected capacitors through the air dielectric between the metallic power conductor and metallic patches forming capacitors, which are correspondingly parallel connected. An integrator, consisting of operational amplifier and gain control feedback capacitor has one input connected through a resistor and capacitor arrangement to the outer patch on the UAV body. The other terminal of the operational amplifier is connected to the metallized surface of the UAV body. The low input impedance of operational amplifier and high gain causes the charging current at the surface to flow through the electric field sensing circuitry and then through metallized surface to earth ground. Therefore, the operational amplifier will provide an output AC voltage which is proportional to the electric field strength at the spherical surface of the UAV. Since the UAV body is symmetric, and the voltage level of EHV conductors is closely controlled, the sum of the charging currents of all four parallel capacitors will remain essentially constant for a given power conductor voltage and distance between UAV and power conductor. Resistor is a current-limiting means to protect against fast rise time surges. Capacitor is relatively large e.g., 5-10 Mfd for AC power conductor monitoring, to block DC signals. Diodes are used to clamp the voltage across resistance-capacitance arrangement. Other diodes in turn clamp the voltage across the inputs of amplifier. Metal oxide surge suppressor protects the circuit components against damage due to momentary transients. The output signal representing the voltage value is compared with a preset, digitally derived reference voltage Vref at comparator, with feedback resistor. The differential output is fed to the flight control computer which maintains the RPD a fixed distance from the power conductor.

The recharging stations and/or UAV's also include the ability to communicate and coordinate. In various preferred embodiments, the recharging area will include a communications unit 2400. The communications unit may comprise one or both of the functionalities of communications with the grid and/or communications with the UAV traffic. As will be appreciated, it may be necessary or advantageous in certain embodiments to integrate the recharging area into the communications network of the electrical grid, or "smart grid." This may be important to prevent a landing UAV that will be drawing power from the grid to be perceived as a fault in the line causing the safety systems to isolate the perceived fault and black out the area. In a presently preferred embodiment, the communication unit, much like a recloser, can identify to the system that a landing UAV is not a fault and the safety systems do not need to shut down power to the line. In other embodiments, the recharging area may be configured to receive electrical power in a manner that removes it from having fluctuations being registered or identified by the grid's safety devices, for example, in a manner similar to lights provided on utility poles.

In embodiments wherein the communications unit communicates with the units to be recharged, any suitable means of communication and coordination should be understood to be within the scope of the invention. One of ordinary skill in the art armed with the present application can easily implement a communications network and protocol to achieve various advantages of the present invention. As will be appreciated, a communications network may serve many purposes, either as an integrated single device or central system having various functions or various discrete communications systems provided in the overall system where necessary or desired.

According to some embodiments of the invention, the communications unit 2400 may be a relatively simple system that allows for the recharging system to communicate information regarding a UAV using it for recharging. The communications unit may receive information sufficient to identify the UAV or its owner and track how much electricity was consumed in recharging to allow the system to invoice for the service. Similarly, the communications unit may separately, or in addition to identifying the UAV and consumption, communicate directly with an incoming UAV. The communications may be as simple as letting a UAV know that the charging area is free of traffic and open for landing. Alternatively, the communications may be more complex and involve two-way communications, scheduling, and the like.

In some embodiments, the communications system may communicate with the UAV only by reading an RFID tag or the like to identify the UAV and its requirements. In other embodiments, the UAV and charging area may communicate using radio, Wi Fi, PLC, or long range systems to coordinate location and even scheduling and the like. In some embodiments, the UAVs and charging stations are part of an integrated communications network that allows the locations of the charging stations and their status communicated to UAVs and/or as part of an overall air traffic control system configured to track UAVs, their travel, and their recharging.

In a presently preferred embodiment, the communication system is configured to communicate with both the electrical grid and the UAV/UAV traffic. Communications with the UAV traffic is preferably multifaceted as discussed above. The communications with the electrical grid is similarly multifaceted as part of the "smart grid" or a SCADA to coordinate with safety equipment to prevent false alarms and well as track their usage and their overall health for preventative maintenance and replacement.

The above embodiments are for illustrative purposes and are not intended to limit the scope of the invention or the adaptation of the features described herein to particular use, field, or environment. Those skilled in the art will also appreciate that various adaptations and modifications of the above-described preferred embodiments can be configured without departing from the scope and spirit of the invention. Therefore, it is to be understood that the invention may be practiced other than as specifically described.

What is claimed is:

1. A method of recharging a UAV in flight comprising:
   sensing a magnetic field generated by electricity flowing through electrical lines associated with a power supply system electrical grid;
   flying a UAV equipped with an inductive charging coil in a proximity of said electrical lines;
   using an electrical current generated in said inductive charging coil to supply an electric charge to a rechargeable battery powering said UAV;
   constructing said UAV with a spherical body and a metallized surface coat to serve as a Faraday cage;
   equipping said UAV with a UAV architecture including a non-transitory computer readable media adapted to store data, a flight plan module, a flight controller, a navigation module, and a locating component; wherein said navigation module comprises a GPS navigation system and a map of electrical power lines to navigate said UAV to travel in a flight path in the proximity of electrical power lines sufficient for inductive charging for at least a portion of said flight path to a destination;
   identifying a predetermined starting point and a flight destination and loading said starting point and said flight destination into said flight plan module;
   identifying a location of charging platforms disposed on electrical towers of said power grid for recharging stops along said flight path;
   determining a flight plan to reach said flight destination using said map of said electrical lines and recharging platforms to map a route for said flight path;
   equipping said UAV with a communication module for communicating with said charging platforms and safety equipment in said electrical grid to prevent false alarms from said UAV interacting with components of the electrical grid; wherein said communications with said safety equipment includes communicating with a SCADA of said electrical grid;
   loading said flight plan and route into said flight controller;
   loading cargo onto said UAV;
   launching said UAV from said predetermined starting point;
   using said locating component comprising a magnetometer and a heat detector for identifying power lines and to fly said UAV along said power lines within a magnetic field generated outside said power lines along said route;
   using said navigation module GPS navigation system to follow said flight plan when GPS navigation is available to said UAV;
   using said locating component and said map of said electrical grid to navigate to said flight destination using said detected power lines for navigation when GPS service is unavailable to said UAV;
   following said route of said flight plan to said flight destination;
   landing said UAV on one or more of said charging platforms for intermittent inductive charging stops along said route to said predetermined destination;
   completing flight to said predetermined destination; wherein said predetermined destination is a residential home and said map of said electrical lines allows navigation to said residential home; and
   unloading said cargo.

* * * * *